(12) United States Patent
Jeffryes et al.

(10) Patent No.: US 6,517,087 B2
(45) Date of Patent: Feb. 11, 2003

(54) HIGH PRESSURE SEAL

(75) Inventors: Andrew Isaac Jeffryes, Thornbury (GB); Robert Kenneth Trowell, Thornbury (GB)

(73) Assignee: Trikon Equipments Limited, Gwent (GB)

(*) Notice: Subject to any disclaimer, the term of this patent is extended or adjusted under 35 U.S.C. 154(b) by 0 days.

(21) Appl. No.: 09/901,615

(22) Filed: Jul. 11, 2001

(65) Prior Publication Data

US 2001/0042963 A1 Nov. 22, 2001

Related U.S. Application Data

(63) Continuation of application No. 09/214,492, filed as application No. PCT/GB97/01963 on Jul. 18, 1997, now Pat. No. 6,279,917.

(30) Foreign Application Priority Data

Aug. 1, 1996 (GB) ............................................. 9616214

(51) Int. Cl.$^7$ ................................................. F16J 15/08
(52) U.S. Cl. ...................... 277/650; 277/644; 277/654; 277/942
(58) Field of Search ................................. 277/650, 654, 277/942, 592, 940, 644

(56) References Cited

U.S. PATENT DOCUMENTS

| 3,163,431 | A | * | 12/1964 | Tanner |
| 4,261,584 | A | * | 4/1981 | Browne et al. |
| 4,477,087 | A | * | 10/1984 | Sutter, Jr. et al. |
| 5,247,800 | A | * | 9/1993 | Mruzek et al. |
| 5,376,213 | A | * | 12/1994 | Ueda et al. |
| 5,380,019 | A | * | 1/1995 | Hillery et al. |
| 5,459,609 | A | * | 10/1995 | Schrag |
| 6,027,145 | A | * | 2/2000 | Tsuru et al. |

FOREIGN PATENT DOCUMENTS

| JP | 57-167568 | * | 10/1982 |
| WO | WO 93/08591 | * | 4/1993 |

* cited by examiner

*Primary Examiner*—Anthony Knight
*Assistant Examiner*—Alison K. Pickard
(74) *Attorney, Agent, or Firm*—Volentine Francos, PLLC

(57) ABSTRACT

A seal is formed between two parts of a high pressured chamber by means of a rigid ring, which is formed with curved surfaces, that engage with an anvil and an enclosure part, the anvil having a similar curved projection. At least one of the engaging surfaces is coated with a soft metal e.g. silver.

19 Claims, 3 Drawing Sheets

HIGH PRESSURE SEAL

CROSS-REFERENCE TO RELATED APPLICATION(S)

This is a Continuation of U.S. patent application Ser. No. 09/214,492, filed Jul. 30, 1999, now U.S. Pat. No. 6,279,917 granted Aug. 28, 2001, which is the U.S. national stage of International Application No. PCT/GB97/01963, filed Jul. 18, 1997. The entire contents of said U.S. application are incorporated herein by reference.

BACKGROUND OF THE INVENTION

This invention relates to high pressure seals and in particular, but not exclusively, when such seals are being formed between two rigid elements.

FIELD OF THE INVENTION

There are a number of occasions in which it is necessary to form seals between two engaging metal faces which are being pressed together, but which are subject to significant fluid pressure which is acting in a sense to urge them apart. It is often desirable that these seals are made and remade over a large number of cycles. Previous seals have used a grease such as a silicone based vacuum grease to lubricate the wear surfaces. Such grease is also used when O-rings are provided. In certain instances this grease is undesirable, because cleaning and regreasing can be needed on a regular basis causing down time of apparatus.

One example of such a sealing arrangement is described in WC-A-9308591 wherein a high pressure chamber is being used to process semiconductor wafers. A particular requirement of such an arrangements is that the levels of particulate material must be kept to a minimum.

JP-A-57167568 (Abstract) discloses a metal gasket which does not cause creep at its sealing edge. A relatively thick copper coating is used.

SUMMARY OF THE INVENTION

From one aspect the present invention consists in a vacuum or high pressure reusable seal formed between two engaging parts of rigid elements comprising, a coating of a soft metal over at least one of the engaging parts and means for using the parts together. The rigid elements may be formed of steel or aluminum.

The seal may include an underlayer, which may, for example, be nickel. That underlayer may be approximately 2 μm thick. The coating may be between 15 μm and 20 μm thick.

The coating may be gold, silver, platinum, palladium copper, lead or indium, or a combination of these. However, materials such as gold and copper diffuse quite readily into semiconductor materials such as silicon or gallium arsenide and so if the seal is being used in association with a machine for processing such materials, those metals may not be appropriate.

A particularly preferred coating is silver and this coating is suitable for use with semiconductor materials.

The invention also includes a high pressure chamber formed by two closable portions and a seal as defined above.

Although the invention has been defined above, it is to be understood it includes any inventive combination of the features set out above or in the following description.

BRIEF DESCRIPTION OF THE DRAWINGS

The invention may be performed in various ways and specific embodiments will now be described, by way of example, with reference to the accompanying drawings, in which.

DETAILED DESCRIPTION OF THE PREFERRED EMBODIMENTS

Figure 1:
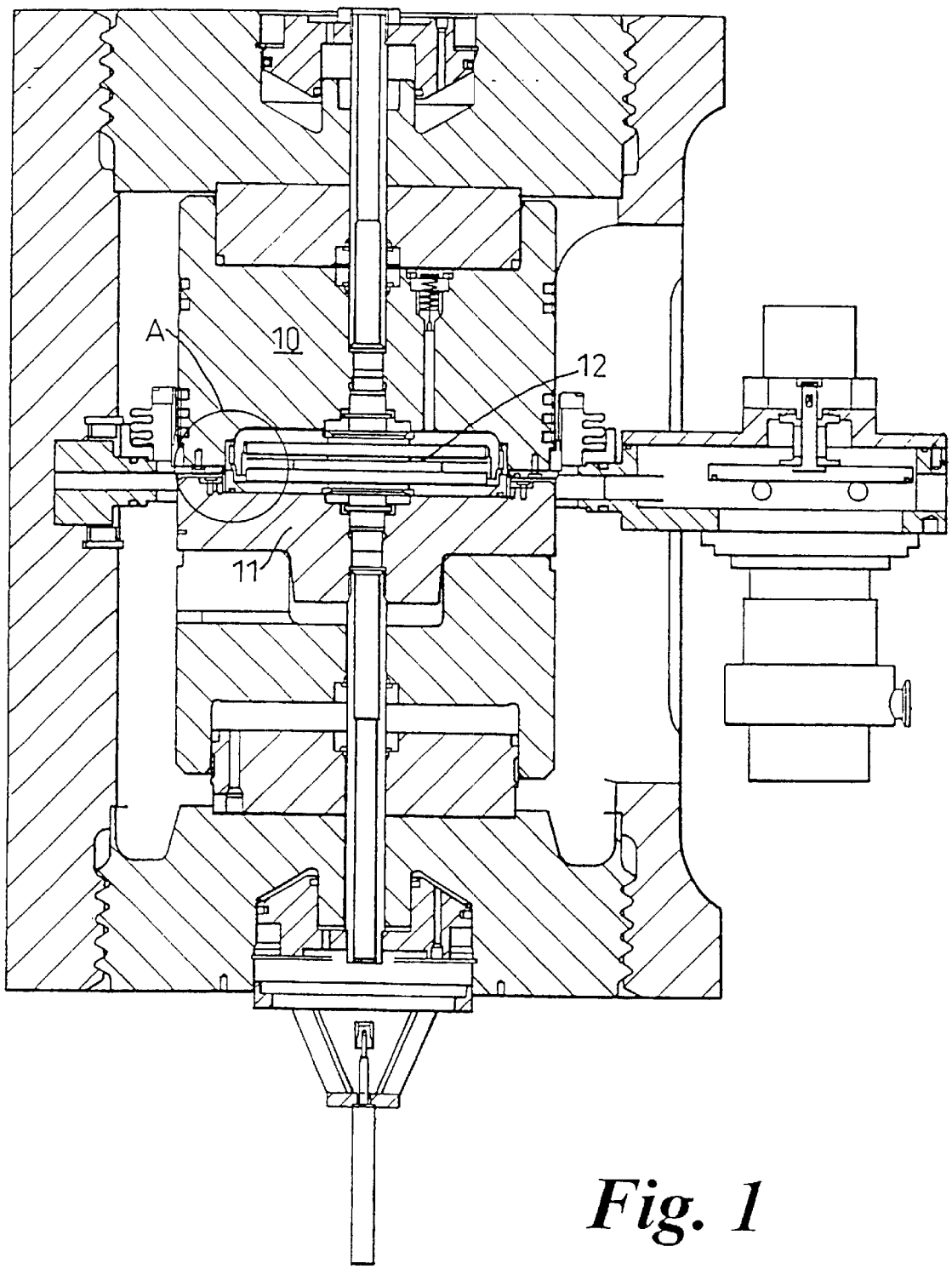
FIG. 1 is a vertical cross-section through a machine of the type described in European Patent Application No. 9292023.4.
Figure 2:
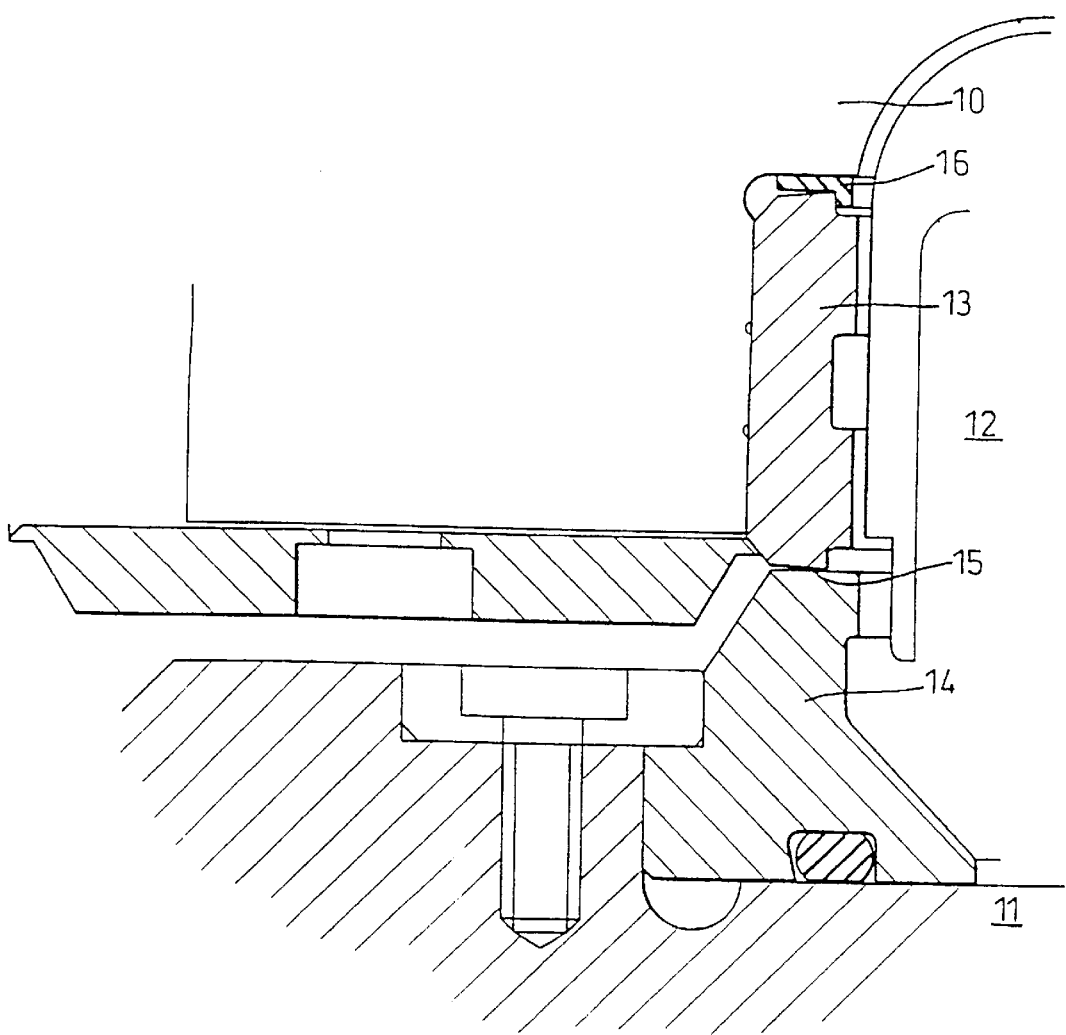
FIG. 2 is a detail at A of the seal of that apparatus.

The apparatus will not be described in detail, but instead the disclosure of European Patent Application No. 9292023.4 is incorporated for that purpose. However, essentially, two enclosure parts 10, and 11, are forced together to form a chamber 12 between them in which semiconductor wafers are processed. As can be seen in FIG. 2 five sealing interfaces occur between the enclosure part 10 and the enclosure part 11. The first seal is formed between a gasket 16 and the upper enclosure part 10. A rigid ring 13 forms seals with the gasket 16 and, at 15, with an anvil 14. The anvil 14 is secured to the lower enclosure part 11 and uses an O-ring to provide a seal between the anvil and the enclosure part 11.

Figure 3:
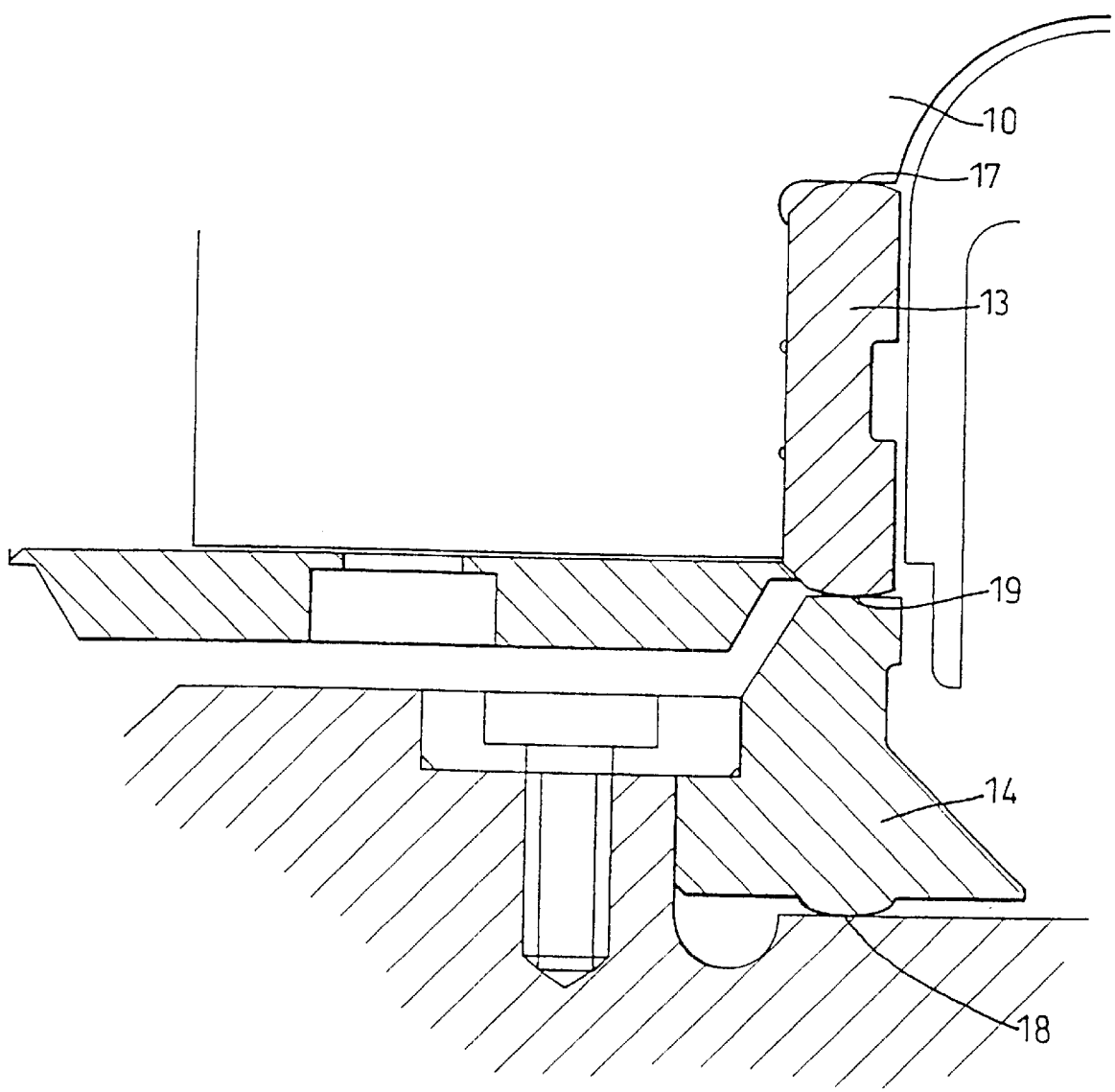
FIG. 3 is a corresponding view of a seal utilizing seal of the invention.

Turning to FIG. 3, it will be seen that the rigid ring 13 is now formed with curved surfaces 17 and 19 that engage with the anvil 14 and the enclosure part 10 and the anvil 14 has similar curved projection 18 in place of the O-ring. It has been found that such engagement shapes are possible if at least one of the engaging surfaces is coated with a soft (e.g. noble) metal, because such metals serve to lubricate the wear surface and remove the need for the use of grease. As has been pointed out already for semiconductor wafer use, silver is particularly preferred and attention may be given to the diffusion rates of the coating metal into the material which is being processed.

If the metal coating is deposited by electro-plating, it is desirable to provide a nickel underlayer, but other methods of forming the coating may be used.

To improve the integrity of the coating, it may be desirable to coat the complete ring 13 or anvil 14 and it may, in some instances, be appropriate to coat both engaging surfaces, although current test show that a single coated surface is extremely effective.

The use of different shapes of engagement surfaces rather than line contacts may have broad applicability.

What is claimed is:

1. A high pressure chamber comprising upper and lower enclosures and a high pressure seal, wherein the high pressure seal is formed between two vertically aligned engaging parts of rigid elements which are secured to the upper and lower enclosures, and wherein the high pressure seal includes a coating of a noble metal over a contact surface of at least one of the engaging parts, and means for urging the vertically aligned engaging parts into direct contact with each other in a vertical direction only, wherein the high pressure seal is devoid of a separate gasket between the engaging parts when the engaging parts are in direct contact with each other wherein the upper and lower enclosures define a semiconductor materials processing chamber, and wherein at least one of the engaging parts has a curved contact surface.

2. A chamber as claimed in claim 1, wherein the rigid elements are made of steel or aluminium.

3. A chamber as claimed in claim 2, wherein a first of the two engaging parts is a rigid ring member sealingly secured to the upper enclosure, and wherein a second of the two engaging parts is an anvil sealingly secured to the lower enclosure.

4. A chamber as claimed in claim 2, wherein the coating is between 15 and 20 μm thick.

5. A chamber as claimed in claim 2, wherein the coating is gold, platinum, pallidium or copper or a combination of these.

6. A chamber as claimed in claim 2, wherein the high pressure seal further includes an underlayer beneath the coating of the noble metal.

7. A chamber as claimed in claim 6, wherein the underlayer is approximately 2 μm thick.

8. A chamber as claimed in claim 6, wherein the underlayer is nickel.

9. A chamber as claimed in claim 8, wherein the underlayer is approximately 2 μm thick.

10. A chamber as claimed in claim 9, wherein the coating is between 15 and 20 μm thick.

11. A chamber as claimed in claim 1, wherein the high pressure seal further includes an underlayer beneath the coating of the noble metal.

12. A chamber as claimed in claim 11, wherein the underlayer is nickel.

13. A chamber as claimed in claim 12, wherein the underlayer is approximately 2 μm thick.

14. A chamber as claimed in claim 11, wherein the underlayer is approximately 2 μm thick.

15. A chamber as claimed in claim 14, wherein the coating is between 15 and 20 μm thick.

16. A chamber as claimed in claim 1, wherein the coating is between 15 and 20 μm thick.

17. A chamber as claimed in claim 1, wherein the coating is gold, platinum, pallidium or copper or a combination of these.

18. A chamber as claimed in claim 1, wherein a first of the two engaging parts is a rigid ring member sealingly secured to the upper enclosure, and wherein a second of the two engaging parts, is an anvil sealingly secured to the lower enclosure.

19. The high pressure chamber of claim 1, wherein the upper and lower enclosures form a semiconductor wafer processing chamber.

* * * * *